(12) United States Patent
Tammi et al.

(10) Patent No.: US 7,650,149 B2
(45) Date of Patent: Jan. 19, 2010

(54) USER REGISTRATION IN A COMMUNICATION SYSTEM

(75) Inventors: Kalle Tammi, Tampere (FI); Anu Leinonen, Tampere (FI); Minna Myllymäki, Tampere (FI)

(73) Assignee: Nokia Corporation, Espoo (FI)

( * ) Notice: Subject to any disclaimer, the term of this patent is extended or adjusted under 35 U.S.C. 154(b) by 713 days.

(21) Appl. No.: 10/813,277

(22) Filed: Mar. 31, 2004

(65) Prior Publication Data

US 2005/0136926 A1 Jun. 23, 2005

(30) Foreign Application Priority Data

Dec. 23, 2003 (GB) ................................ 0329857.7

(51) Int. Cl.
*H04W 4/00* (2009.01)
(52) U.S. Cl. .............. 455/435.2; 455/435.1; 455/432.1; 455/445; 455/558; 370/338
(58) Field of Classification Search ...... 455/432.1–444, 455/411; 370/331–344; 380/247
See application file for complete search history.

(56) References Cited

U.S. PATENT DOCUMENTS

| | | | | |
|---|---|---|---|---|
| 5,003,629 | A * | 3/1991 | Ness-Cohn et al. | 340/7.45 |
| 5,764,730 | A * | 6/1998 | Rabe et al. | 455/403 |
| 5,933,785 | A * | 8/1999 | Tayloe | 455/558 |
| 5,946,619 | A * | 8/1999 | Kolev | 455/432.1 |
| 6,119,001 | A * | 9/2000 | Delis et al. | 455/433 |
| 6,510,153 | B1 * | 1/2003 | Inoue et al. | 370/354 |
| 6,567,664 | B1 * | 5/2003 | Bergenwall et al. | 455/435.1 |
| 6,771,623 | B2 * | 8/2004 | Ton | 370/331 |
| 6,859,651 | B2 * | 2/2005 | Gabor | 455/411 |
| 7,003,294 | B2 * | 2/2006 | Singhai et al. | 455/435.1 |
| 7,079,511 | B2 * | 7/2006 | Abrol et al. | 370/331 |
| 7,177,642 | B2 * | 2/2007 | Sanchez Herrero et al. | 455/435.1 |
| 7,434,258 | B2 * | 10/2008 | Bajko et al. | 726/21 |
| 2004/0258046 | A1 * | 12/2004 | Wu et al. | 370/352 |

(Continued)

FOREIGN PATENT DOCUMENTS

WO WO 00/36869 6/2000

(Continued)

OTHER PUBLICATIONS

"Digital cellular telecommunications system (Phase 2+); Universal Mobile Telecommunications System(UMTS); IP Multimedia (IM) Subsystem Cx and Dx Interfaces; Signalling flows and message contents (3GPP TS 29.228 version 5.3.0 Release 5)", ETSI TS 129 228 v5.3.0, Mar. 2003, pp. 1-41.

(Continued)

*Primary Examiner*—Sharad Rampuria
(74) *Attorney, Agent, or Firm*—Mintz, Levin, Cohn, Ferris, Glovsky and Popeo, P.C.

(57) ABSTRACT

A method of reassigning user data in a communications system is disclosed, with a plurality of identities for each user. The method includes storing in a user information store the plurality of identities in association with a first serving controller, the plurality of identities being associated with respective registration statuses selected from a registered status and an unregistered status; detecting that the user has requested registration to a second serving controller using one of the identities; and issuing a registration termination request identifying each identity, which has been newly assigned to the second serving controller as a result of the requested registration. Responsive to the registration termination request, re-registration notification is issued to the user and all identities of the said user from the first serving controller are dissociated.

22 Claims, 4 Drawing Sheets

U.S. PATENT DOCUMENTS

2005/0009520 A1 * 1/2005 Herrero et al. ........... 455/435.1

FOREIGN PATENT DOCUMENTS

| WO | WO 0036869 A1 * | 6/2000 |
| WO | WO 02/091785 A1 | 11/2002 |
| WO | WO 02091785 A1 * | 11/2002 |

OTHER PUBLICATIONS

"3GPP TS 24.229—3$^{rd}$ Generation Partnership Project; Technical Specification Group Core Network; IP Multimedia Call Control Protocol based on Session Initiation Protocol (SIP) and Session Description Protocol (SDP); Stage 3, Release 5", Sep. 2004.

* cited by examiner

| USER ID | PUBLIC ID | REGISTRATION STATUS | LOCATION | |
|---|---|---|---|---|
| UE 1 | PiD1 | REG | | ⎫ |
| | PiD2 | REG | | ⎬ SET 1 |
| | PiD3 | REG | | ⎭ |
| | PiD4 | UNREG | | ⎫ |
| | PiD5 | UNREG | S-CSCF1 | ⎬ SET 2 |
| | | | | ⎭ |
| UE 1 | PiD6 | REG | | ⎫ |
| UE 2 | | REG | | ⎬ SET 3 |
| UE 2 | PiD7 | UNREG | | ⎫ SET 4 |

USER REGISTRATION IN A COMMUNICATION SYSTEM

BACKGROUND OF THE INVENTION

1. Field of the Invention

The present invention relates to user registration in a communication system.

2. Description of the Related Art

A diverse range of communication systems are in use today enabling communication between two or more entities, such as user equipment and/or other nodes associated with the system. Such systems may comprise, for example, communication of voice, data, and multimedia data.

Communication systems providing wireless communication for user terminals or other nodes are known. An example of a wireless system is a public land mobile network (PLMN). A PLMN is typically a cellular network wherein a base transceiver station (BTS) or similar access entity serves user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are another cellular network, a public switched telephone network (PSTN) and packet switched data networks such as an IP (Internet Protocol) based network. The communication between the user equipment and the other elements of the communication system are based on an appropriate communications protocol, which defines the "rules" under which communication is handled in the system.

In the current third generation (3G) wireless system, there are defined various servers for the handling of different communication services for mobile users. These include servers that provide call state control functions, known as CSCFs. Control functions may also be provided by entities such as a home subscriber server (HSS) and various application servers (AS). The HSS is typically for permanently storing the user's (subscriber's) profile. For example, in the Release 5 architecture for 3G, as specified by the $3^{rd}$ Generation Partnership Project (3GPP), these entities can be found located in the IP Multimedia Subsystem (IMS). Call state control function provides a serving function S-CSCF, an interrogating function, I-CSCF and a proxy function P-CSCF.

The IMS network may sit at the hub of the 3G architecture, supporting an IP based network that handles both traditional voice telephony and multimedia services. The 3GPP has chosen Session Initiation Protocol (SIP) as a core session signalling protocol for 3G networks. SIP has been developed by the Internet Engineering Task Force (IETF). The 3GPP specification 24.229 describing the IMS network basic operation from an SIP perspective can be found at http://www.3gpp.org/ftp/Specs/latest/Rel-5/24_series/24229-560.zip. It should be noted that SIP is a request/response style protocol, in the sense that for every message sent from a source, there is an associated response from the destination confirming receipt of the sent message.

Users are registered with S-CSCFs according to location and available communication links. The interrogating serving call state control function (I-CSCF) is used to contact the S-CSCFs. When the S-CSCF which is the assigned S-CSCF for a user cannot be contacted by the I-CSCF, it is possible to assign a new S-CSCF for a user during the registration procedure. When this is done, it is possible that the home subscriber server HSS receives a multimedia authentication request (MAR) command including an S-CSCF name which is not the same as the previously assigned S-CSCF for the user. In the existing 3GPP protocol, the home subscriber server can deregister the registrations in the old S-CSCF by using the Registration-Termination-Request (RTR) command. By assigning the reason NEW_SERVER_ASSIGNED to this command, this causes the user's public identity which is registered in the new S-CSCF to be deregistered from the old S-CSCF. A subsequent RTR command must then be issued for the rest of the user's public identities with the deregistration reason set to SERVER_CHANGE which causes the corresponding user data to be removed from the old S-CSCF and initiates a deregistration procedure for the user equipment UE to request the user equipment UE to re-register. The re-registration process is then directed by the I-CSCF to the new S-CSCF.

Thus, two individual command sets are required to implement the two necessary steps, that is the deregistration of the users' public identities from the previous S-CSCF and the re-registration of the public identities at the new S-CSCF.

SUMMARY OF THE INVENTION

It is an aim of the present invention to make this procedure more command-efficient.

According to one aspect of the present invention there is provided a method of reassigning user data in a communications system, the user data comprising a plurality of identities for each user, the method comprising the steps of: storing in a user information store the plurality of identities in association with a first serving controller, the plurality of identities being associated with respective registration statuses selected from a registered status and an unregistered status; detecting that the user has requested registration to a second serving controller using one of said identities; issuing a registration termination request identifying the or each identity, which has been newly assigned to the second serving controller as a result of the requested registration; responsive to the registration termination request, i) issuing a re-registration notification to the user including the or each identity which has a registered status and which were not assigned to the second serving controller as a result of the requested registration, and ii) disassociating all identities of the said user from the first serving controller.

It will be clear that the re-registration notification causes any unassigned identities of registered status to be reassigned to the second serving controller. Unassigned identities of unregistered status need not be reassigned.

Another aspect provides a communications system comprising: a first serving controller; a user information store which holds for a user a plurality of identities in association with the first serving controller, the plurality of identities being associated with respective registration statuses selected from a registered status and an unregistered status; a second serving controller configured to transfer to the user information store a user authentication request identifying the user; and wherein the user information store is operable to detect the user authentication request and comprises means for inserting into a registration termination request issued to the first serving controller the or each identity of that user, which were newly associated to the second serving controller as a result of the user authentication request, and wherein the first serving controller is operable, responsive to the registration termination request, to i) issue a re-registration notification to the user including the or each identity which has a registered status and which were not assigned to the second serving controller as a result of the user authentication request, and ii) disassociate all identities of the said user from the first serving controller.

Another aspect provides a serving controller for use in a system for providing communication between users, the first serving controller having an interface adapted to communicate with a user information store whereby a plurality of identities each with respective registration statuses associate a user with the serving controller and being operable, responsive to a registration termination request received from the user information store, to i) issue a re-registration notification to the user including the or each identity which has a registered status and which incorrectly associate the user with the first serving controller, and ii) disassociate all identities of the said user from the serving controller.

In one embodiment, multiple user equipment (equivalent to a private ID) may share one or more public identities or identity sets. For example, the help desk employees may share one common public identity SIP: helpdesk@example.com. Each employee may register/ deregister independently, and the serving controller routes the SIP call request to available employees so that any of them may pick up the call. In addition, each user equipment may also have non-shared individual public identities. An aspect of the present invention can be applied in this context to ensure that the serving controller is the same for all the user equipments sharing the same identity/identities. Therefore, in one embodiment of the present invention, if any of the public identities of a sharing user equipment is registered to a new serving controller, the serving controller is changed for all of those user equipments and their public identities. To achieve this, the registration termination request (RTR) initiates deregistration of all of those user equipments and corresponding public identities. To achieve this, when the serving controller receives a registration termination request, it can find out, based on locally stored information, if there are any public identities associated to the user equipment which are shared by another user equipment. If there is, the serving controller can start the deregistration procedure for all of those user equipments and their public identities.

In the 3GPP architecture, the user information store is constituted by the home subscriber server, but it will be appreciated that in other architectures a different database may be provided. Also, the first and second serving controllers are provided by the serving call state control functions in a 3GPP architecture, but again it will be appreciated that in a different architecture any suitable controller could perform this role.

The registration termination request can be an RTR command according to the known 3G protocol, or can be the equivalent or other suitable command in different protocols.

BRIEF DESCRIPTION OF THE DRAWINGS

For a better understanding of the present invention and to show how the same may be carried into effect, reference will now be made by way of example to the accompanying drawings, in which.

DETAILED DESCRIPTION OF THE PREFERRED EMBODIMENTS

Certain embodiments of the present invention will be described in the following by way of example, with reference to the exemplifying architecture of a third generation (3G) mobile communications system. However, it shall be appreciated that the embodiments may be applied to any suitable communication system.

Figure 1:
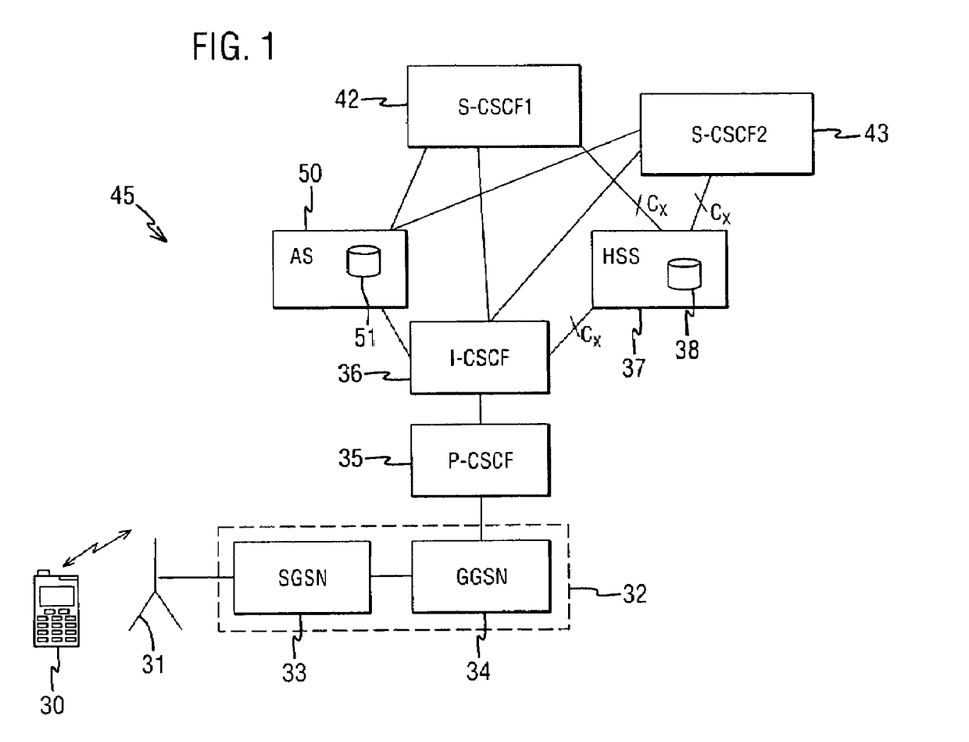
FIG. 1 is a schematic diagram showing the environment in which an embodiment of the invention can be implemented.

Reference is made to FIG. 1 which shows an example of a network architecture wherein the invention may be embodied. In FIG. 1 an IP Multimedia Network (IMS) 45 is provided for offering IP multimedia services for IP Multimedia Network subscribers.

As described above, IP Multimedia (IM) functionalities can be provided by means of a mobile communication system. A mobile communication system is typically arranged to serve a plurality of mobile user equipment (UE) usually via a wireless interface between the user equipment and at least one base station of the communication system. The mobile communication system may logically be divided between a radio access network (RAN) and a core network (CN).

In the system a base station 31 is arranged to transmit signals to and receive signals from mobile user equipment 30 of a mobile user i.e. subscriber via a wireless interface between the user equipment and the radio access network. Correspondingly, the mobile user equipment is able to transmit signals to and receive signals from the radio access network via the wireless interface.

In the shown arrangement the user equipment 30 may access the IMS network 45 via the access network associated with base station 31, respectively. It shall be appreciated that, although, for clarity reasons FIG. 1 shows a base station of only one radio access network, a typical communication network system usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations, for example in the radio access network level. It shall thus be appreciated that the name, location and number of the network controllers depends on the system.

The mobile user equipment 30 may comprise any appropriate mobile user equipment adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, it is sufficient to note that the user may use a mobile station for tasks such as for making and receiving phone calls, for receiving and sending data from and to the network and for experiencing multimedia content or otherwise using multimedia services. A mobile station may include an antenna for wirelessly receiving and transmitting signals from and to base stations of the mobile communication network. A mobile station may also be provided with a display for displaying images and other graphical information for the user of the mobile user equipment. Camera means may be provided for capturing still or video images. Speaker means are also typically provided. The operation of a mobile station may be controlled by means of an appropriate user interface such as control buttons, voice commands and so on. Furthermore, a mobile station is provided with a processor entity and a memory means.

It shall be appreciated that although only one mobile station is shown in FIG. 1 for clarity, a number of mobile stations may be in simultaneous communication with base stations of a mobile communication system.

The core network (CN) entities typically include various switching and other control entities and gateways for enabling the communication via a number of radio access networks and also for interfacing a single communication system with one or more communication system such as with other cellular systems and/or fixed line communication systems. In the 3GPP systems the radio access network controller is typically connected to an appropriate core network entity or entities such as, but not limited to, a serving general packet radio service support node (SGSN) 33. The radio access network controller is in communication with the serving GPRS support node via an appropriate interface, for example on an Iu interface. Although not shown, the SGSN typically has access to designated subscriber database configured for storing information associated with the subscription of the respective user equipment.

The serving GPRS support node, in turn, typically communicates with a gateway GPRS support node (GGSN) 34 via the GPRS backbone network 32. This interface is commonly a switched packet data interface.

FIG. 1 shows an application server (AS) 50. The user equipment 30 may connect, via the GPRS network, to the application server that is connected to one or more data networks such as, but not limited to, the exemplifying Internet Protocol (IP) network. It shall be appreciated that a great number of application servers may be connected to each data network.

The communication systems have developed in the direction wherein services are provided for the user equipment by means of various functions of the data network that are handled by controller entities, such as servers. For example, in the current third generation (3G) wireless multimedia network architectures it is assumed that several different servers providing various control functions are used for the service provision control. These include functions such as the call session control functions (CSCFs). The call session functions may be divided into various categories such as a proxy call session control function (P-CSCF), interrogating call session control function (I-CSCF), and serving call session control function (S-CSCF). It shall be appreciated that similar functions may be referred to in different systems with different names. For example, in certain applications the CSCFs may be referenced to as the call state control functions.

A user who wishes to use services provided by an application server via the IMS system may need first to register with a serving controller, such as the serving call session control function (S-CSCF1) 42. As shown in FIG. 1, communication between the S-CSCF 42 and the user equipment 30 may be routed via at least one proxy call session control function (P-CSCF) 35 and an interrogating call session control function I-CSCF 36. The proxy CSCF 35 is thus for proxying messages from the GGSN 34 to a serving call session control function 42. The S-CSCF 42 in FIG. 1, in turn, provides the control entity the user equipment 30 needs to be registered with. The registration is required to enable the user equipment to request a service from the communication system.

The system of FIG. 1 is further arranged such that a user who has been provided with required communication resources by the backbone network and is registered to the S-CSCF 42 has to initiate the use of services offered by the application server 50 by sending a request for the desired service to the S-CSCF 42 over the communication system.

In FIG. 1, another serving call session control function 43, S-CSCF2, is illustrated. In practice there will of course be a number of S-CSCFs.

A user information storage entity may also be provided for storing subscriber i.e. user related information. In the particular embodiment the storage entity is shown to be provided by means of a home subscriber server (HSS) 37. The home subscriber server (HSS) 37 can be queried by other function entities over the appropriate interfaces, e.g. during session set-up procedures and later. The subscriber information may include information such as data required for registration and authentication purposes (e.g. identities and registration status of the subscriber) and so on. The HSS 37 can also be used for storing permanently subscriber profile information. In particular, the home subscriber server holds information associating public identities with particular user equipment UE, and identifying the S-CSCF to which that UE is registered. Each UE is identified with unique private identity, which has the form of Network Access Identifier, for example UE1@example.org.

Figure 2:
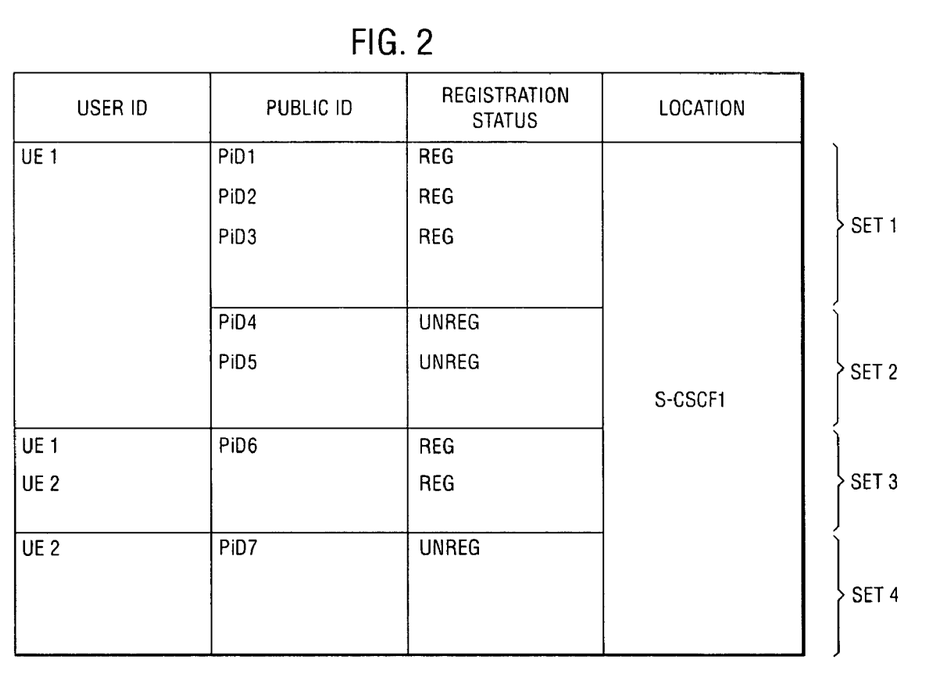
FIG. 2 is a schematic diagram illustrating the storage of user identities.

FIG. 2 shows by way of example the contents of the home subscriber server database 38. It will be appreciated that this is by way of example only and the precise layout and protocol will vary in accordance with the network requirements. Each user equipment UE may be associated with multiple public identities which are labeled Pid1 to Pid7 in FIG. 2. The public identity is user's public address, which is used for communications within the IMS system. The public user identity can, for example, be in a form of SIP URI like sip: pid1@example.org. The public identities may be handled individually or they can be grouped to one or several public identity sets. The public identities may be shared by multiple UEs. Each individual public identity or a set of public identities are registered independently by each UE sharing them and they can have different services executed in the network. Each public identity can have a registered or unregistered status, which is dependent on the UE, and, when registered, is associated with a particular S-CSCF.

It is supposed to be the case that all public identities for a particular user equipment UE should be registered with the same S-CSCF. When multiple UEs share one or more public identities, all the public identities associated with those UEs have to be registered to the same S-CSCF. Sometimes circumstances occur (as described later) so that one of the public identities is registered with a different S-CSCF to the others. The following described embodiment takes care of such a situation in a command-efficient manner. This will now be described with reference to FIG. 3.

In a 3G network, when a user first switches on his mobile terminal, he must register his user ID or address with the network before allowing the terminal to fully connect. This is done by sending an SIP 'REGISTER' message, which includes details of the user's address, from the terminal to the IMS. The IMS processes this information, via the serving call state control function (S-CSCF), storing the relevant registration information at the HSS. This registration information may include the status of the user such as the location, terminal capability and user availability. The registration is acknowledged by the IMS through a suitable response message that is also in accordance with SIP. Subsequent registrations also take place ('re-REGISTER') whenever the preceding registration has expired, or when there is a change in the status of the user or another reason to refresh the registration.

Figure 3:
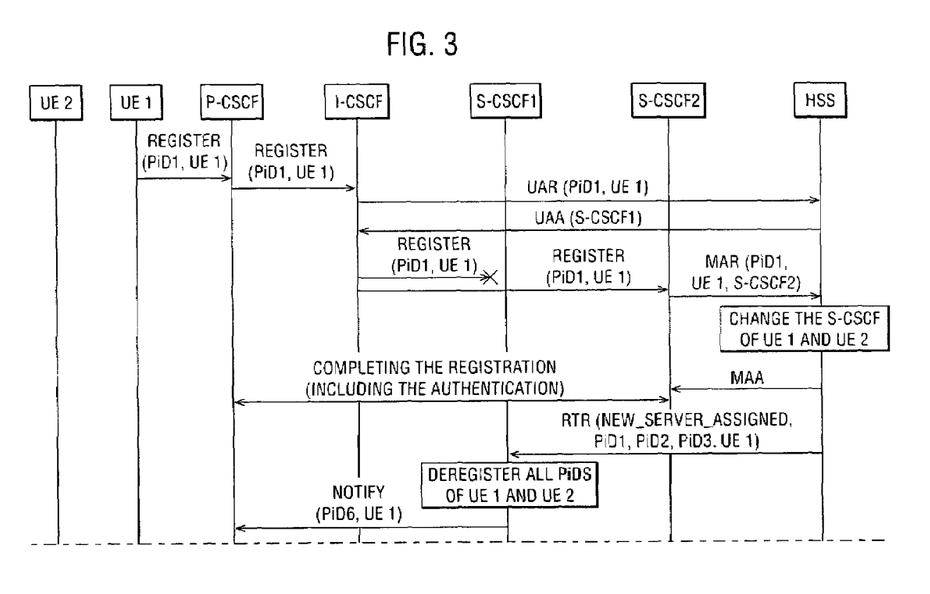
FIG. 3 is a schematic diagram illustrating the message flow.

If, in a registration procedure, the previously assigned S-CSCF does not respond to the register message sent from the I-CSCF after a timeout, a new S-CSCF is assigned for the user. In FIG. 3, a failed registration request is shown as being transmitted from the user equipment UE1 to the first S-CSCF1, 42. A subsequent registration request in respect of the first public identity PID1 is shown having been successfully made to the second S-CSCF2, 43. However, in order to request authentication information and to inform the HSS the user equipment UE1 as having been registered in respect of S-CSCF2, the S-CSCF2 issues a Multimedia-Auth-Request (MAR) command which identifies the second S-CSCF2. The home subscriber server 37 receives the MAR command and, noticing that the command includes a different S-CSCF name than the previous one which had been stored, dispatches an RTR command towards the first S-CSCF1 via the Cx interface. The home subscriber server 37 inserts into the RTR command the deregistration reason NEW_SERVER_ASSIGNED, and also inserts the public identities belonging to the same implicitly registered set (Set 1) as the notified public identity Pid1. In this case, it will insert Pid1, Pid2 and Pid3. The home subscriber server inserts also the private identity of the UE1 into the RTR. When the first S-CSCF1 receives the RTR command with the deregistration reason assigned to the value NEW_SERVER_ASSIGNED it removes the user data of those public identities which are in the request and the user data of all other public identities, which are related to the same UE1, that is, to the same private identity. That is, it removes Pid1-Pid6 as being associated with S-CSCF1. It also issues a NOTIFY message to the user equipment UE1 identifying the public identities/identity sets which had a registered status and which were not included in the RTR command, and which have now been deregistered from S-CSCF1. The NOTIFY message contains an indication for the user equipment UE1 to re-register these public identities at the new S-CSCF2. It achieves this by performing a re-registration procedure as indicated in FIG. 3, and as described above. Note that the public identities (Set 2) which are in an unregistered state at the first S-CSCF1 are removed, but no NOTIFY message is sent for those identities because there is no need to re-register them.

When removing the public identities of the UE1, the S-CSCF detects the shared public identity, in the example Pid6, and based on that, it removes all the user data, which is related to the sharing UE2. That is, it removes Pid6-Pid7 as being associated with S-CSCF1. It also issues a NOTIFY message to the user equipment UE2 identifying the public identities/identity sets which had a registered status and which were not included in the RTR command, and which have now been deregistered from S-CSCF1. The NOTIFY message contains an indication for the user equipment UE2 to re-register these public identities at the new S-CSCF2. It achieves this by performing a re-registration procedure as indicated in FIG. 3, and as described above. Note that the public identity 7 (Set 4) which is in an unregistered state at the first S-CSCF1 is removed, but no NOTIFY message is sent for that identity because there is no need to re-register it.

The above-described embodiment of the invention thus optimises an existing functionality of 3GPP IMS deregistration. In particular it optimises the Cx interface usage and the behaviour of the HSS in the deregistration procedure during the change of the assigned S-CSCF. This is achieved in the above described embodiment by carrying out the deregistration procedure of multiple public user identity sets and UEs with a single RTR command during the change of the S-CSCF. The reason NEW_SERVER_ASSIGNED indicates that the S-CSCF shall start the deregistration procedure (i.e. issue a notify message) towards the user equipment UE for the rest of the user's public identity/identity sets which are registered for that S-CSCF1 and which are not yet registered in the newly assigned S-CSCF2. Another alternative is that a new reason value is introduced instead of using the existing reason NEW_SERVER_ASSIGNED. This might be necessary to guarantee the interworking between different releases of 3GPP IMS solutions.

Thus, only a single RTR/RTA command pair needs to be processed, instead of multiple pairs as in the existing 3G system.

It will readily be appreciated that the IMS network illustrated in FIG. 1 may comprise further S-CSCFs, interrogating CSCFs and proxy CSCFs. Likewise, although embodiments of the present invention have been described in the context of 3G using SIP, other suitable systems and interface protocols could be used.

It is also noted herein that while the above-described exemplifying embodiments of the invention, there are several variations and modifications which may be made to the disclosed solution without departing from the scope of the present invention as defined in the appended claims.

The invention claimed is:

1. A method, comprising:
    detecting that a user equipment has requested a registration to a second serving controller using at least one of a plurality of identities in association with a first serving controller, the plurality of the identities being associated with respective registration statuses selected from a registered status and an unregistered status;
    issuing a registration termination request identifying the at least one of the plurality of identities, which has been newly assigned to the second serving controller as a result of the requested registration; and
    responsive to the registration termination request, issuing a re-registration notification to the user equipment including the at least one of the plurality of identities which has a registered status and which was not assigned to the second serving controller as a result of the requested registration, and disassociating all identities of the said user from the first serving controller, wherein at least two user equipments have a shared identity and a non-shared identity and checking, when the non-shared identity has been newly assigned to the second serving controller, whether the user eguipment has the shared identity and, if so, issuing a re-registration notification to other user equipments sharing the shared identity.

2. A method according to claim 1, wherein disassociating all identities of the said user equipment from the first serving controller comprises removing the all identities and their data from the first serving controller, and removing their association in the user information store with the first serving controller.

3. A method according to claim 1, wherein the plurality of identities include a set of unregistered statuses, and wherein the set is disassociated but not reassigned.

4. A method according to claim 1, wherein the registration termination request includes a deregistration reason.

5. A method according to claim 4, wherein the deregistration reason in a 3rd generation partnership project communication system comprises NEW_SERVER_ASSIGNED.

6. A method according to claim 1, wherein detecting that the user equipment has requested registration comprises receiving at the user information store an authentication request.

7. A system, comprising:
    a first serving controller;
    a user information store configured to hold for a user a plurality of identities in association with the first serving controller, the plurality of identities being associated with respective registration statuses selected from a registered status and an unregistered status;
    a second serving controller configured to transfer to the user information store a user authentication request identifying the user equipment; and wherein the user information store is configured to detect the user authentication request and to insert into a registration termination request issued to the first serving controller each identity of that user equipment, which was newly associated to the second serving controller as a result of the user authentication request, and wherein the first serving controller is configured, responsive to the registration termination request, to issue a re-registration notification to the user equipment including each identity which has a registered status and which was not assigned to the second serving controller as a result of the user authentication request, and disassociate all identities of the said user equipment from the first serving controller, wherein at least two user equipments have a shared identity and a non-shared identity and checking, when the non-shared identity has been newly assigned to the second serving controller, whether the user equipment has the shared identity and, if so, issuing a re-registration notification to other user equipments sharing the shared identity.

8. A system according to claim 7, wherein the user information store comprises a home subscriber server.

9. A system according to claim 7, wherein the serving controller comprises a call state control function.

10. A system according to claim 7, wherein the communications system is wireless.

11. A system according to claim 7, wherein said plurality of identities includes a shared identity which is associated with at least one other user equipment.

12. A system according to claim 11, wherein the first serving controller is operable to issue a re-registration notification to the at least one other user equipment.

13. An apparatus, comprising:
an interface configured to communicate with a user information store, wherein a plurality of identities, each with respective registration statuses, associate a user equipment with the apparatus and being configured, responsive to a registration termination request received from the user information store, to issue a re-registration notification to the user equipment including each identity which has a registered status and which incorrectly associates the user equipment with the apparatus, and disassociate all identities of the said user equipment from the apparatus, wherein at least two user equipments have a shared identity and a non-shared identity and checking, when the non-shared identity has been newly assigned to a second serving controller, whether the user equipment has the shared identity and, if so, issuing a re-registration notification to other user equipments sharing the shared identity.

14. An apparatus according to claim 13, which is operable to disassociate all identities of the said user equipment by removing the identities and their data in the apparatus and by removing their association in the user information store.

15. An apparatus according to claim 13, which is operable to read a deregistration reason in the registration termination request.

16. An apparatus according to claim 13, which is operable to issue a re-registration notification to any other user equipments sharing one of the said identities.

17. A system, comprising:
storing means for storing in a user information store a plurality of identities in association with a first serving controller, the plurality of identities being associated with respective registration statuses selected from a registered status and an unregistered status;
detecting means for detecting that a user equipment has requested a registration to a second serving controller using at least one of said plurality of identities;
issuing means for issuing a registration termination request identifying the at least one of the plurality of identities, which has been newly assigned to the second serving controller as a result of the requested registration;
notification means for issuing a re-registration notification to the user equipment including the at least one of the plurality of identities which has a registered status and which was not assigned to the second serving controller as a result of the requested registration; and
disassociating means for disassociating all identities of the said user equipment from the first serving controller,
wherein the notification and disassociating means are responsive to the registration termination request, and
wherein at least two user equipments have a shared identity and a non-shared identity and checking, when the non-shared identity has been newly assigned to the second serving controller, whether the user equipment has the shared identity and, if so, issuing a re-registration notification to other user equipments sharing the shared identity.

18. A system according to claim 17, wherein the disassociating means comprises removing means for removing the all identities and their data from the first serving controller, and removing their association in the user information store with the first serving controller.

19. A system according to claim 17, wherein the plurality of identities include a set of unregistered statuses, and wherein the set is disassociated but not reassigned.

20. A system according to claim 17, wherein the detecting means comprises receiving means for receiving at the user information store an authentication request.

21. A system according to claim 17, wherein at least two user equipments have a shared identity and a non-shared identity and the system further comprises checking means for checking, when the non-shared identity has been newly assigned to the second serving controller, whether the user equipment has the shared identity and, if so, the notification means is configured to issue a re-registration notification to other user equipments sharing the shared identity.

22. A computer-readable storage medium encoded with instructions that, when executed on a computer, perform a process, the process comprising:
detecting that a user equipment has requested a registration to a second serving controller using at least one of a plurality of identities in association with a first serving controller, the plurality of the identities being associated with respective registration statuses selected from a registered status and an unregistered status;
issuing a registration termination request identifying the at least one of the plurality of identities, which has been newly assigned to the second serving controller as a result of the requested registration; and
responsive to the registration termination request, issuing a re-registration notification to the user equipment including the at least one of the plurality of identities which has a registered status and which was not assigned to the second serving controller as a result of the requested registration, and disassociating all identities of the said user from the first serving controller, wherein at least two user equipments have a shared identity and a non-shared identity and checking, when the non-shared identity has been newly assigned to the second serving controller, whether the user equipment has the shared identity and, if so, issuing a re-registration notification to other user equipments sharing the shared identity.

* * * * *

UNITED STATES PATENT AND TRADEMARK OFFICE
CERTIFICATE OF CORRECTION

| | | |
|---|---|---|
| PATENT NO. | : 7,650,149 B2 | Page 1 of 1 |
| APPLICATION NO. | : 10/813277 | |
| DATED | : January 19, 2010 | |
| INVENTOR(S) | : Tammi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 927 days.

Signed and Sealed this
Eighteenth Day of October, 2011

David J. Kappos
*Director of the United States Patent and Trademark Office*